United States Patent
Perschk

(10) Patent No.: US 11,194,466 B2
(45) Date of Patent: Dec. 7, 2021

(54) PROCEDURE FOR ENTERING COMMANDS FOR AN ELECTRONIC SETUP

(71) Applicant: Patty's GmbH, Hamburg (DE)

(72) Inventor: Andreas Perschk, Hamburg (DE)

(73) Assignee: Patty's GmbH, Hamburg (DE)

( * ) Notice: Subject to any disclaimer, the term of this patent is extended or adjusted under 35 U.S.C. 154(b) by 0 days.

(21) Appl. No.: 16/716,813

(22) Filed: Dec. 17, 2019

(65) Prior Publication Data

US 2020/0201537 A1 Jun. 25, 2020

(30) Foreign Application Priority Data

Dec. 19, 2018 (DE) .................... 10 2018 132 794.3

(51) Int. Cl.
*G06F 3/048* (2013.01)
*G06F 3/0488* (2013.01)
*G06F 3/0484* (2013.01)
*G06F 3/16* (2006.01)
*G06T 7/11* (2017.01)
*G06F 3/0482* (2013.01)

(52) U.S. Cl.
CPC ........ *G06F 3/04883* (2013.01); *G06F 3/0482* (2013.01); *G06F 3/04845* (2013.01); *G06F 3/167* (2013.01); *G06T 7/11* (2017.01); *G06T 2207/20104* (2013.01)

(58) Field of Classification Search
CPC ........ G06F 3/167; G06F 3/017; G06F 3/0488; G06T 7/11; G06T 2207/20104
See application file for complete search history.

(56) References Cited

U.S. PATENT DOCUMENTS

| | | | | |
|---|---|---|---|---|
| 2011/0022393 A1* | 1/2011 | Waller | ............... | G01C 21/3664 |
| | | | | 704/270 |
| 2011/0313768 A1* | 12/2011 | Klein | ...................... | G06F 3/038 |
| | | | | 704/251 |
| 2014/0006033 A1* | 1/2014 | Jung | ........................ | G10L 15/22 |
| | | | | 704/275 |
| 2015/0339051 A1* | 11/2015 | Yang | ..................... | G06F 3/0482 |
| | | | | 382/189 |
| 2016/0231818 A1* | 8/2016 | Zhang | ................... | A63F 13/213 |
| 2017/0330479 A1* | 11/2017 | Bowman | ................ | G09B 5/125 |
| 2017/0337360 A1* | 11/2017 | Gaspard | .................. | G06F 16/00 |

(Continued)

OTHER PUBLICATIONS

Migneault et al., Comparing Voice with Touch Screen for Controlling the Instructor's Operating Station of a Flight Simulator; 2007; IEEE; 6 pages.*

(Continued)

*Primary Examiner* — Linh K Pham
(74) *Attorney, Agent, or Firm* — Howson & Howson LLP

(57) ABSTRACT

The invention relates to a method for entering commands into an electronic device with a touch-sensitive display unit on which an image can be displayed and at least an area of the displayed image can be selected by means of a pointer and in which segmentation can thereby be carried out in a targeted manner and with a speech recognition unit by means of the commands can be generated for the electronic device. According to the invention, the user of the electronic device selects at least a partial area of a displayed image, and the selected area is subjected to an image analysis following a simultaneous acoustic input.

10 Claims, 1 Drawing Sheet

(56) References Cited

U.S. PATENT DOCUMENTS

2018/0247065 A1* 8/2018 Rhee ............... H04M 1/67
2020/0042286 A1* 2/2020 Bui ................ G06F 9/451
2020/0064458 A1* 2/2020 Giusti .............. G01S 7/02

OTHER PUBLICATIONS

Wu-chung Feng; An Integrated Multimedia Environment for Speech Recognition Using Handwriting and Written Gestures; © 2002; IEEE; 10 pages.*
Watanabe et al., Man and Machine Bidirectional Communication Interface Using Voice and Pointing Action; 2004; IEEE; 6 pages.*
Silva et al., Perceiving Graphical and Pictorial Information via Hearing and Touch; © 2016; IEEE, 14 pages.*
Yoshikawa et al., Voice and gesture recognition system facilitating Communication between man and virtual agent; © 2006; IEEE; 5 pages.*

* cited by examiner

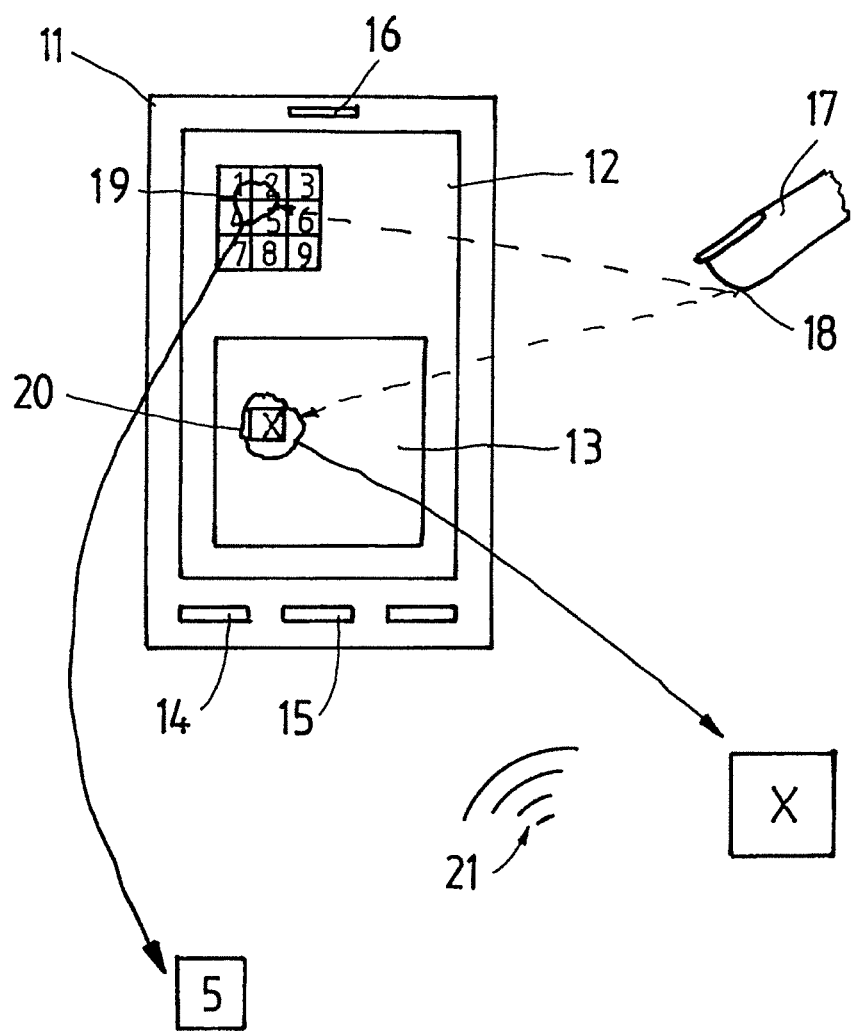

PROCEDURE FOR ENTERING COMMANDS FOR AN ELECTRONIC SETUP

BACKGROUND

The invention relates to a method for entering commands into an electronic device with a touch-sensitive display unit on which an image can be displayed and a pointer can be moved over at least a partial area of the displayed image, which makes it possible to carry out a segmentation in a targeted manner, and with a speech recognition unit or acoustic receiving unit, which makes it possible to recognize the acoustic inputs to the electronic device.

It is generally known that commands are input into electronic data processing devices by means of a keyboard or an on-screen keyboard. It is also known that the command is input by means of a pointer shown on the display unit, for example the "mouse" pointer. In particular when using a computer "mouse," the command is often entered in such a way that a depicted area is first selected by using the "mouse" pointer. The command is then executed by clicking on the area selected in this way. The transmission of commands to electronic data processing devices by means of voice control is known as well. For this purpose, the data processing system is equipped with a microphone and a speech recognition unit, which analyze the spoken command and carry out the action in question.

These types of input commands can easily be carried out on standalone units. In mobile data processing devices such as smartphones, tablet computers or the like, however, there is generally no pointer with which a command or an action can be initiated or carried out.

Such mobile devices are operated by means of a touch-sensitive display unit using the user's finger or a pen. When commands are input with a pointer, it is necessary for the image shown on the display device to provide areas in which the pointer can become active, for example by clicking on it. The displayed image must therefore, from the start, have areas that can be activated and in which the pointer can become active in order to execute a command. Otherwise, the image can only be viewed.

The selection of areas shown in a displayed image with the user's finger is relatively imprecise. It is also difficult to click on the displayed image with the finger since a differentiation must be made electronically between a swipe and a selection. The finger must furthermore be able to hit the same area twice. This inaccuracy is exacerbated by the fact that, in particular, smartphones have only relatively small screens on which a large number of selectable areas are shown and on which often several areas are touched simultaneously with one finger. This leads to an increased number of operating errors.

SUMMARY

The object of the invention is to develop a method of the type described in the introduction in such a way that a further use and different operation of the data processing device with a touch-sensitive display unit are possible. In particular, it should be possible to use any image as a starting point for generating a command.

The object according to the invention is achieved in that the user of the electronic device uses the pointer to select at least a partial area of a displayed image which is subjected to an image analysis by an acoustic input to generate a command for the electronic device. By combining the touch of the selected area and the acoustic input, other commands can be safely generated for the electronic device. The input difficulties with mobile devices can be overcome as well with so-called touchscreens. In particular, it is provided that the pointer is a finger of the user.

The image analysis of the touched or selected area makes it possible to recognize what is depicted in this area. The area can then be analyzed for commands that are possible and/or useful for the user, which the electronic device or the data processing device is to carry out. The user can be offered a variety of commands or actions as well.

It is possible, for example, for the user to point to or touch an object shown in the displayed image. This object is recognized and further information about this object is displayed after the acoustic input, which can be a spoken word. This results in a manual segmentation of the entire image and thus a quick selection of the area or product of interest. The user thus quickly reaches a desired result. Other analyses are possible as well, for example the separate display of an input field with the possibility of input, if a displayed input field has been touched with the pointer or the finger that has no function yet on the displayed image.

The advantage is that the image displayed on the display unit does not have to be segmented or edited beforehand in order to define active and thus selectable areas. The program stored for the acoustic and touch-sensitive input only analyzes the area shown in the image and executes the commands displayed or symbolized there or other actions that are obvious from the content of the image. It can also be a photo without defined active areas.

The user can only touch a relatively large area with his finger as a pointer. Via the acoustic input into the microphone that is available in most mobile data processing devices and especially in smartphones, the area touched can be evaluated by the image analysis and specified in more detail by using speech recognition so that a command can be entered with simple means. In particular, an accidental initiation of a command is avoided when the finger swipes over the command area.

As a result of the image analysis, a command can be generated for the electronic device accordingly, which is shown or symbolized on the display unit. This makes it possible to control and operate the electronic data processing device.

However, it is also possible to start a program of the data processing device on the basis of the recognized area, which will then start running. It can be provided that, as a result of the image analysis, further information about the selected image area is displayed on the display unit. This makes it possible, for example, to quickly find offers or information on the displayed and selected object even on a touch-sensitive display unit.

Depending on the size of the objects and symbols displayed on the display unit, the selected area may be segmented as a result of the image analysis, and the recognized objects may be displayed on the display unit. It is then possible to enlarge the recognized objects in the image that is subsequently displayed and, if necessary, to display them with further information so that it becomes easier to select them with the large pointer such as the user's fingertip.

It may be advantageous for the speech recognition unit to respond to a selection of predefinable or teachable commands.

In that case, a specific acoustic command is only executed if the or a corresponding area on the display unit is touched at the same time. This significantly increases the operating safety. It can therefore also be provided that certain selectable areas are assigned predeterminable acoustic inputs and that the action associated with this area is only carried out after the receipt of the predetermined acoustic input. An acoustic input should be understood to mean any type of acoustic signal, that is to say a spoken word, a sound or any other noise or sound waves transmitted by means of structure-borne noise.

In general, it is advantageous if a selectable area or the selected area changes optically when the pointer sweeps over it. This gives the user an indication of the area he has just selected, which can be activated by an additional acoustic command. However, this is only possible with previously prepared images.

It can further be provided that a command is only generated for the electronic device when the pointer is in the selected area and an acoustic input takes place simultaneously or within a predefinable time period. This largely prevents any accidental, incorrect operation of the electronic device. The user points at an object with his finger, for example, and says an activation word at the same time. Then, the area which was touched at the time of the acoustic input is analyzed.

However, it can also be provided that the acoustic input can be performed a short period of time later, for example 0.5 seconds to 2 seconds later, in order to carry out the desired or preset action. In any case, however, an action is not carried out with only one input, that is to say only due to a touch input or an acoustic input. In this way, any accidental initiation of an action is reliably prevented in a smartphone with a touch-sensitive display when it is carried in a pocket since the input that is still required to carry out an action or a command is missing.

Furthermore, it is advantageous if the selected area is or remains displayed on the display unit regardless of the action taken or initiated. This has the advantage that the user can understand the history of the areas selected by the user.

The advantage of the method according to the invention is in particular that a displayed image can be used for a concrete input to the data processing device. The image was either generated by the data processing device as a user interface or it may be any image or photograph that is displayed on the display unit. The desired area is touched by the user's finger. It is often inevitable that several areas are touched so that no clear command is recognizable, or an incorrect action is initiated. Together with the acoustic input, the command that is actually desired is carried out, or the actually desired action is initiated.

The image analysis of the area touched can also easily take the user to a shop that offers the object shown or at least provides further information about this object. The user receives an image of a shop window on his smartphone, for example, which shows a variety of products. If he is interested in an object and would like more information about it, he taps the area of the display unit on which the object is displayed. By means of an acoustic command, for example a password for a specific program stored on the data processing device, the touched image area is subjected to an image analysis, and the object and possibly other accidentally touched objects are recognized. These recognized objects are displayed on the display unit in such a way that the user can see and select them better.

If only one object is recognized, it can be provided that the program immediately displays further information or points of purchase and purchase prices for the touched object. The operation thus becomes clear and errors are avoided. This type of command input can be favorable in particular for smartphones with a relatively small touch-sensitive display. The user no longer needs to enlarge the image until the desired area is large enough for a clear touch with his finger. Rather, it is sufficient to touch the "general" area and to carry out the desired action with an appropriate acoustic command or password.

Furthermore, incorrect entries are largely excluded since the stored action is only carried out with a simultaneous acoustic command and touch. This is particularly advantageous in the case of preset control surfaces on the display unit. In any displayed image, the first action may be an image analysis of the touched or marked area, the result of which can be used for further actions.

BRIEF DESCRIPTION OF THE DRAWINGS

The sole FIGURE is a view of a smartphone showing a procedure for entering commands according to an embodiment.

DETAILED DESCRIPTION

Provisions can also be made for an object to be encircled or swept over by the pointer, for example the user's finger, and thus be marked, in the event of a larger representation. This identifies an area that is subjected to an image analysis after receipt of the corresponding acoustic command. This way, programs or actions or commands which can be predetermined can also be triggered or activated quickly and easily on the basis of an image, even without a pointer being shown on the display device.

The invention will be explained in more detail below with reference to the schematic drawing. The only FIGURE shows a smartphone 11, which has a touch-sensitive display 12 on which a plurality of command fields 1, 2, 3, 4, 5, 6, 7, 8, 9 are shown. Furthermore, at least one image 13 can be shown on the display 12. Furthermore, the smartphone 11 has input buttons 14 with which predetermined functions can be initiated immediately. There is also a microphone 15 and a loudspeaker 16. In this respect, the smartphone corresponds to a conventional smartphone and therefore requires no further explanation.

For entering the command, the user's finger 17 is generally used, which touches the desired command field 1, . . . , 9 with the fingertip 18 in order to carry out the associated command. The command fields 1, . . . , 9 are, however, often relatively small on the already small display 12 of the smartphone so that the fingertip 18 touches a larger area 19 and thus often several command fields 1, 2, 4, 5 are touched and thus selected at the same time. This leads to errors in the input.

The smartphone 11 is equipped with an acoustic speech recognition unit, which may be designed as a program. If the user selects the control panel 5 he desires with his fingertip 18, there is initially no reaction. An image analysis takes place, which recognizes the presence of four control panels 1, 2, 4, 5 in the area 19 touched. The smartphone then waits for an acoustic input 21, for example the word "FIVE," which is linked to the control panel 5. It is thus made completely clear that even though the control panels 1, 2, 4, 5 were touched, only the control panel 5 was actually intended. The corresponding stored command can then be executed. The command is, in fact, only carried out when the control panel 5 is touched, and the appropriate acoustic command "FIVE" is given so that incorrect operations are prevented.

Other actions or programs of the data processing device 11 can be carried out in this manner as well. An image 13 with a large number of elements is shown on the display 12, for example. The user is interested in the element X and touches that element and possibly also the surrounding area 20 with his fingertip 18. This touched area 20 is subjected to an image analysis by a predeterminable acoustic command, and the desired action is carried out. If the image element X is to be used as the starting point for a shop, the user can immediately reach an offer page for this object X by means of an acoustic input 21, for example "SHOP." Other similar products can be displayed as well. Tones or other words or word combinations can also be used as acoustic input. The words can also describe the touched object. A signal transmitted with structure-borne noise can also serve as an acoustic input. The finger touches the desired area and, by knocking or the like, this structure-borne sound signal is passed on to the speech recognition unit, which then functions as an acoustic receiver.

In the exemplary embodiment shown, there is only one object X in the touched area 20. If several recognizable objects are accidentally touched, for example, the image analysis first leads to a segmentation of the touched or swept or obvious area, and the individual objects are preferably displayed separately from one another in an enlarged manner. Then, the user can better select the object that he actually intended. A two-stage segmentation of the image therefore takes place. Initially, the user manually segments the overall image by tapping on a desired area or marking it in another way. Then, the second segmentation takes place in the form of the image analysis, by means of which the area touched is further divided into separable objects. These selected objects can then be displayed separately and conveniently by the user.

Such a combined entry of a selection of an object with the pointer or the finger and the simultaneous acoustic command input relating to the area touched can be performed with the means already present in a smart phone, tablet computer or the navigation system in the motor vehicle (microphone, touch-sensitive display). This makes the operation clear and easier.

The invention claimed is:

1. A method for entering commands into an electronic device, the method comprising the steps of:
   displaying an image on a touch-sensitive display unit of the electronic device such that a fingertip of a user's finger is movable over at least a partial area of the displayed image, the electronic device having a speech recognition unit by means of which acoustic inputs into the electronic device are recognized;
   receiving a selection made with the fingertip of the user of the electronic device on at least a segment of an image displayed on the touch-sensitive display unit;
   receiving an acoustic input with the speech recognition unit of the electronic device and subjecting at least the selected segment of the image to image analysis after receiving the acoustic input; and
   generating a command for the electronic device or carrying out an action on the electronic device only if the fingertip is on at least the selected segment of the image and the acoustic input is received simultaneously which command or action has been shown or symbolized on the display unit, and/or runs a program on the electronic device as a result of the image analysis and displays information about at least the selected segment of the image on the display unit as a result of the image analysis.

2. The method according to claim 1, further comprising the steps of segmenting at least the selected segment of the image as a result of the image analysis and displaying objects recognized by the image analysis on the display unit.

3. The method according to claim 2, wherein, during said step of receiving an acoustic input, the speech recognition unit responds to a plurality of predefinable or teachable inputs.

4. The method according to claim 3, further comprising the step of assigning predetermined acoustic inputs to selectable areas on the display unit such that the action associated with each of the selectable areas is carried out only after the assigned predetermined acoustic input is received.

5. The method according to claim 4, further comprising the step of optically changing the selectable areas or at least the selected one of the selectable areas when the pointer sweeps over it.

6. The method according to claim 4, wherein the selected one of the selectable areas is or remains displayed on the display unit regardless of the action taken or initiated.

7. The method according to claim 1, wherein, during said step of receiving an acoustic input, the speech recognition unit responds only to a plurality of predefinable or teachable inputs.

8. The method according to claim 1, further comprising the step of assigning predetermined acoustic inputs to selectable areas on the display unit such that the action associated with each of the selectable areas is carried out only after the assigned predetermined acoustic input is received.

9. The method according to claim 8, further comprising the step of optically changing the selectable areas or at least the selected one of the selectable areas when the fingertip sweeps over it.

10. The method according to claim 9, wherein the selected one of the selectable areas is or remains displayed on the display unit regardless of the action taken or initiated.

* * * * *